Dec. 15, 1964 C. BENINI 3,161,260

SELF-CLEANING AND VENTILATING BRAKE

Filed Sept. 11, 1962

Inventor
CELESTINO BENINI

By *Irwin and Finley*
Attorneys

3,161,260
SELF-CLEANING AND VENTILATING BRAKE
Celestino Benini, 14 Via Lucchesi, Ferrara, Italy
Filed Sept. 11, 1962, Ser. No. 222,907
Claims priority, application Italy, Sept. 12, 1961,
16,293/61
1 Claim. (Cl. 188—78)

This invention relates to the friction elements for brakes, particularly in automotive vehicles.

It is well known that, by the quick stopping of vehicles traveling on highways at high speed a so-called "fading" in the braking is experienced, which is a rapid decrease of the brake efficiency, which occurs particularly when brakes are placed under either continuous, or rapidly repeated heavy loads. When fading occurs, the stopping of the vehicle may take place much farther than required and, when said fading does not occur equally upon all brakes, and particularly the front wheel brakes, a side skidding of the vehicle may occur.

Up-to date, the fading in the braking was attributed to an insufficient dissipation of the heat from the brake lining, that tends to generate excessively high temperatures in the brake lining and the shoe. In order to keep said temperatures within acceptable limits, it has been proposed to provide the brake shoes with inclined grooves, so designed as to facilitate the circulation therethrough of air streams, adapted to effect a powerful cooling of the braking surfaces by air circulation.

It has been found however that if a large number of inclined and/or transversal grooves is provided, the braking lining is excessively weakened and the projecting parts between the grooves tend to break away. On the other hand, if the number of transversal grooves is not sufficiently large, the dust particles which are formed during the braking in consequence of the consumption of the linings between the contacting braking surfaces, roll between said braking surfaces thus acting as a lubricant and generating a fading effect, even in absence of superheating of the brake linings.

It is a primary object of the invention to overcome the above stated disadvantages, and particularly the effect of lubrication by the brake lining dust by providing grooves of the brake shoes and/or drum or disc so formed as to completely discharge the brake lining dust as soon as it is formed.

Accordingly the invention provides brake linings, and particularly the lining of the brake shoes, which comprise a system of grooves in Y or herringbone formation, whereby the inclined branches of the slot system are so arranged as to promote a conveyance of a large part of the lining dust into the longitudinal groove or grooves of the brake shoe, from one end of which the dust is discharged outwardly.

A further object of the invention is to provide a brake in which the friction surfaces are formed with inclined grooves spaced by such a distance as to not excessively weaken the projecting active parts of the brake linings.

The provision, according to the invention, of an improved arrangement of grooves in the brake linings, and particularly in the brake shoe linings, which permits of readily discharging the brake lining dust, has the following advantages:

(1) The friction coefficient is kept always at a high level and consequently the braking time is shortened.

(2) Due to the shortening of the braking time, the wear of the brake lining is reduced and the total heat developed during each braking is also reduced.

Other objects and advantages of the invention will be apparent from the following specification of some embodiments of the invention, made with reference to the accompanying drawings, in which.

Figure 1:
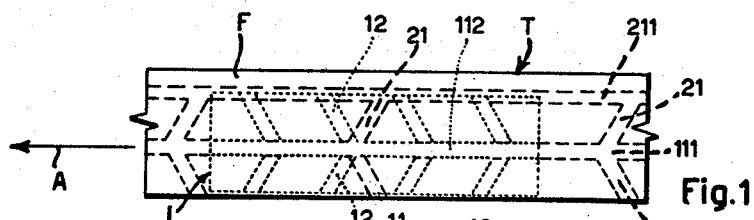
FIGURE 1 shows diagrammatically in plan view a part of a brake drum with underlying brake shoe, having both the friction surfaces grooved according to the invention.
Figure 2:
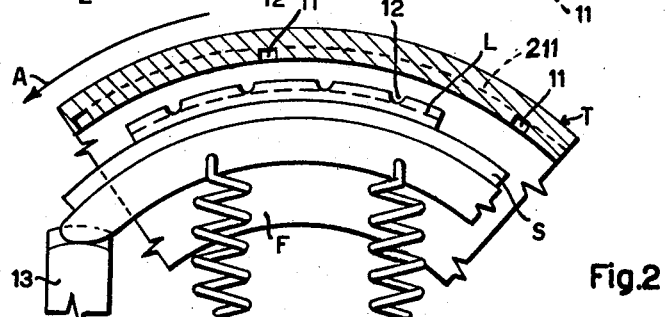
FIGURE 2 is a vertical section of the brake drum and a side view of the corresponding brake shoe.
Figure 3:
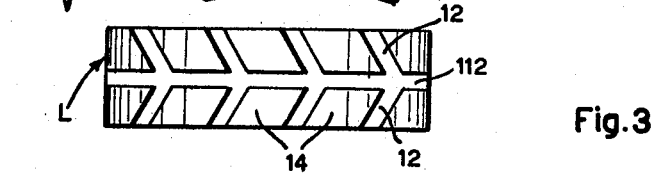
FIGURE 3 is a plan view of the grooved lining of a brake shoe.

With reference to the FIGS. 1 to 3, T is the drum of a brake, whose shoe S is hinged at 13 (FIG. 2) and may be brought by known means with its friction lining 4 towards or away from the inner surface of said brake drum T.

As shown particularly in FIG. 3, the brake shoe lining is subdivided by a system of grooves 12, 112, in substantially herringbone formation into a plurality of braking isles or patches 14 of substantially parallelepipedal shape, having an extended area, especially in the circumferential direction of the shoe, so as resist to high braking stresses. The inclined grooves 12 usually diverge in the direction of rotation (arrow A) of the co-acting drum T.

In the embodiment as shown in said FIGURES 1 and 2 also the drum is provided with a system of inclined grooves 11 and 21 meeting in correspondence of a central longitudinal groove 111. The grooves 11 open at the open drum edge, while the opposite grooves 21 open in a longitudinal preferably circular groove 211 formed in correspondence of the supporting web F of the drum. The inclination of the drum grooves 11–21 is opposite to that of the grooves 12 of the co-acting shoe lining 4.

Figure 4:
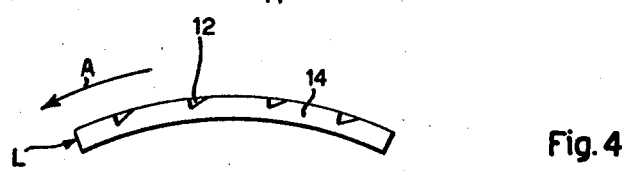
FIGURE 4 is a side view of a brake shoe lining, provided with saw tooth-shaped grooves

The grooves 12, 11 and 21 may have either a substantially U-shaped section (FIG. 2) or also a V-shaped or sawtooth section (FIG. 4).

From the foregoing, it is apparent that the grooves of the lining must not be excessively close together, in order not to excessively weaken the lining material and must not be excessively spaced as in this case a superheating would occur.

To sum up:

The grooves 11 serve for conveying the dust which is formed by the consumption of the lining away from the working surface, namely towards the drum exterior.

The grooves 21 serve for conveying the said dust towards the drum interior, into the groove 211.

The groove 111 serves also for collecting a part of the said dust and for distributing same into the inclined grooves 11 and 21 and at the same time serves for discharging the hot air from the interior to the exterior of the drum, through said inclined grooves.

Figure 5:
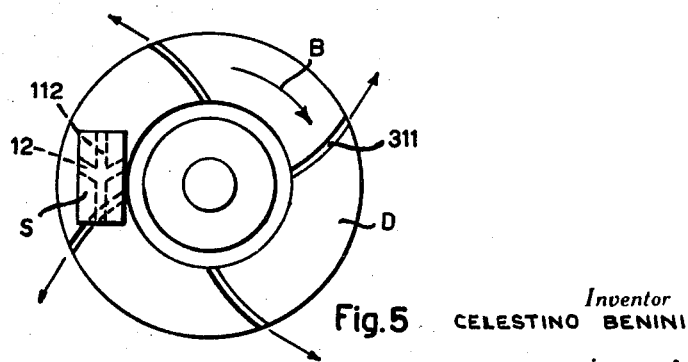
FIGURE 5 is a diagrammatical side view of a disc brake, modified according to the invention.

The just-described groove system may be employed also on the lining of disc brake shoes S, FIG. 5, in which case the surfaces of the disc D may be provided with slightly curved substantially radial grooves 311.

I claim:

A brake comprising a rotatable drum having a circular braking surface, a brake shoe having a friction lining, said brake shoe being movably mounted so as to be capable of engaging a surface of the friction lining with said braking surface of the drum, each of said engageable surfaces of the drum and shoe friction lining being provided with a central longitudinal groove and with a plurality of transverse V-shaped grooves meeting said central groove at their apices, and said V-shaped grooves in one of the said engageable surfaces being inverted with respect to the V-shaped grooves in the other.

References Cited in the file of this patent

UNITED STATES PATENTS

| | | |
|---|---|---|
| 1,715,806 | Wersall | June 4, 1929 |
| 1,974,905 | Walker | Sept. 25, 1934 |
| 2,163,884 | Le Brie | June 27, 1939 |
| 2,438,483 | Tack | Mar. 23, 1948 |
| 2,516,544 | Breeze | July 25, 1950 |
| 2,743,792 | Ransom | May 1, 1956 |
| 2,851,132 | James | Sept. 9, 1958 |

FOREIGN PATENTS

| | | |
|---|---|---|
| 645,484 | Great Britain | Nov. 1, 1950 |
| 1,139,089 | France | Feb. 4, 1957 |